CARL H. SAVIT,
MARK HOLZMAN,
INVENTORS.

BY THEIR ATTORNEYS

Spensley & Horn

3,197,732
METHOD OF GEOPHYSICAL EXPLORATION
Carl H. Savit, Van Nuys, and Mark Holzman, Los Angeles, Calif., assignors to Western Geophysical Company of America, Los Angeles, Calif., a corporation of Delaware
Filed Nov. 30, 1961, Ser. No. 156,093
6 Claims. (Cl. 340—15.5)

This invention relates to geophysical exploration and more particularly to an improved method for forming seismographic records and record sections.

In making seismographic surveys by the well-known reflection method, a seismic disturbance is initiated at a selected point on or adjacent to the earth's surface and reflected seismic waves are detected at a plurality of points spread out in a selected pattern on the earth's surface. The seismic waves are detected by sensitive instruments, such as geophones, which convert the seismic energy to electrical signals of comparable intensity. These electrical signals are amplified and recorded on a multi-channel recording apparatus, or seismograph, in this application.

In a common arrangement of seismographic and exploratory and recording apparatus used for seismographic profiling work, a plurality of seismometer groups is disposed in contact with the ground in a preferably straight line at opposed sides of the shot point. A recording unit provided with suitable amplifying and recording means is electrically connected to the detectors to amplify and record the electrical impulses produced by the detectors upon the arrival at each detector group of seismic waves generated by an explosion at the shot point and reflected by the various underground formations.

The electrical impulses produced by the detector groups are recorded by multi-channel magnetic tape recorders, with a channel corresponding to each detector group. Since the detector groups are at varying horizontal distances from the shot point, a greater time interval will be required for a reflected wave to reach the outermost detector group than the time interval which is required for the reflected wave to reach an inner detector group from an interface which is the same vertical distance below each. As the depth of the reflection increases, the time differential required to reach the various detector groups becomes smaller with the time differential approaching zero as the depth of the reflection becomes very large. The time-scale corrections introduced into the seismographic record to compensate for the varying horizontal distances from the shot point are well known and are termed the normal move-out corrections. The various detector groups may, furthermore, be situated at various elevations. In order to reduce all of the readings at the various seismometer groups to a common horizontal plane, time origin corrections are introduced into the seismographic record. Similarly, time origin adjustments of the time scale are made to compensate for varying amounts of near-surface weathered material under the different detector groups. In off-shore explorations, such corrections may be required by varying depths of water.

The amplitude of the signal intercepted by the seismometer groups varies greatly with time. It is obvious that a signal reflected from a very deep stratum is much weaker than a similar signal reflected from a superficial or shallow stratum. It is necessary in forming records of the reflected signals to maintain a controlled width and scale of signals upon the photographically reproduced record in order to show both the signals of maximum amplitude and the signals of minimum amplitude. In order to record all ranges of signals, it is common in the prior art to control the amplitude of the reflected signals by using automatic volume controls to reduce the very large amplitudes and to increase the very small amplitudes.

By the reflection method described above, it has been common in the prior art to determine the structure of a geologic section by recording the amplitudes of the reflected signals on seismograph record sections. The amplitudes have been recorded in various ways to clearly distinguish large amplitudes from smaller amplitudes and by such record sections it has been possible to determine the existence of an interface or structural change beneath the earth in the area under survey. The reflection method has, however, been concerned primarily with the existence of structural changes and has, until recently, not been determinative of the kind of stratigraphic changes which exist. Thus, the reflection system has been utilized in the prior art to determine the geometrical structure of the geologic section. The present invention is concerned with the qualitative, or stratigraphic information, of the geologic section under survey.

In the prior state of the art, in order that the recorded signals be clear and evident for precise interpretation as to the point of reflection, it has been necessary that secondary signals, generally termed "noise," be separated from reflected, meaningful signals. In the process of removing noise, seismologists have, in the past, used methods which necessarily have impaired or destroyed the individuality of the reflections. Since noise frequencies and reflection frequencies tend to overlap a great deal, any filter which optimizes the signal-to-noise ratio will also remove part of the reflection signal. When some of the frequencies making up the reflection signal are removed, some of the individuality or character of the reflection is also removed. In addition, to keep signals and noise in bounds, it is common in the prior art to utilize automatic volume control which tend to make all reflections the same size. As discussed hereinbefore, it has been necessary to control the amplitude of recorded signals in order to retain the signals within an appropriate range on the final record.

It is an object of the present invention to provide an improved method of recording seismographic information whereby the recorded information is qualitative such that the kinds of underground formations are determinable from the records.

It is another object of the present invention to provide an improved method of seismograph recording wherein the signals produced by means of the reflection method of seismographic exploration can be visually recorded to form a meaningful, easily analyzed record of the underground strata.

It is a further object of the present invention to provide a method of geophysical exploration whereby with a single explosive charge, a record is produced from which lithological changes in sub-surface strata can be detected.

A further object of the present invention is to provide a method of geophysical exploration and seismographic recording whereby differing character of reflected signals is recorded to differentiate the different character of sub-surface strata from which the respective signals are reflected.

The present invention comprises a method of geophysical exploration for locating and identifying underground strata, comprising a sequence of steps. Signals reflected from a reference point by underground strata to a plurality of detectors are recorded upon a plurality of channels of a magnetic-tape recording. The recording is produced in such manner as to obtain the most faithful recording of reflected signals. The played-back signals in each channel are corrected to make appropriate static and dynamic time-scale corrections in the initially recorded signal. The data on the tape recording is played back such that the data in each channel is reproduced as a magnetically equalized signal and a non-equalized signal which is 90° out of phase with, and has a rising frequency characteristic relative to, the equalized signal. The time-scale corrected signals from the plurality of channels are added either before or after equalization and the absolute value of the added equalized signal is obtained. Similarly, the time-scale corrected non-equalized signals from the plurality of channels are added and the absolute value of the added non-equalized signals is obtained. The added absolute value of the equalized signal and the added absolute value of the non-equalized signal or powers thereof are then summed to obtain a single signal which is sharp and clear and correlative with the character of the sub-surface strata from which the respective signals are reflected.

The novel features which are believed to be characteristic of the invention both as to its organization and method of operation, together with further objects and advantages thereof will be better understood from the following description considered in connection with the accompanying drawing. It is to be understood, however, that the drawing is for the purpose of illustration and description only, and is not intended as a definition of the limits of the invention.

Figure 1:
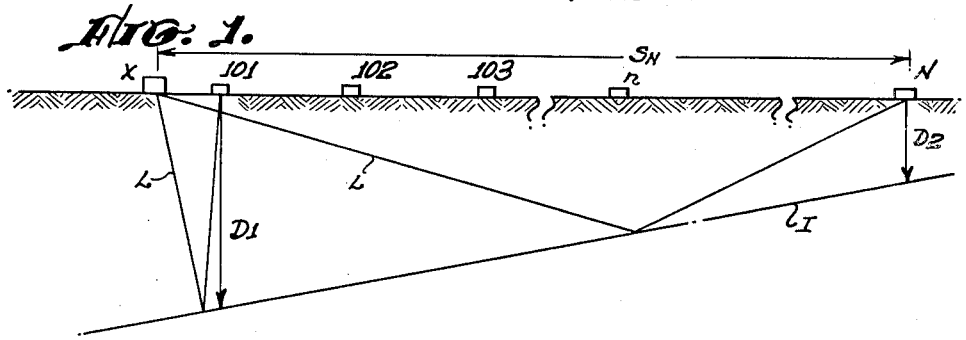
FIGURE 1 is a diagrammatic representation showing a group of twelve seismographic detectors positioned to one side of a shot point, and a reflecting interface for purposes of illustration.

Referring now to the drawing and particularly to FIGURE 1, the variables to be considered in the method of the present invention may be more clearly understood by reference to FIGURE 1 wherein a typical seismograph surveying field setup is shown diagrammatically to illustrate moveout corrections, time origin corrections, and dip corrections. A plurality of seismograph detector groups is equally spaced to each side of a source of seismic disturbance shown to be the shot point X in FIGURE 1. For clarity, the spaced series of detector groups is shown to one side of the shot point only, since the description and method will apply equally to the surface at the opposite side of the shot point. The first detector 101 is one unit of distance from X at a distance designated as $S_1$; detector 102 is three units from X at a distance $S_2$; detector 103 is five units; and so forth with any detector $n$ at a distance $S_n$ and the outermost detector N at a distance $S_N$. A reflecting interface I is shown beneath the surface. The reflecting interface is not horizontal and is at a depth $D_1$ beneath the first detector 101 and a lesser depth $D_2$ beneath the outermost detector $S_N$. Other arrangements of detectors are well known and commonly used in the art. Application of the present invention to such other arrangements will be readily apparent to one skilled in the art from the illustrative example presented in this description.

By means well known to the art the detectors are electrically connected to amplifiers which amplify the electrical impulses produced by the detectors upon the arrival at each detector of seismic waves generated by the explosion at the shot point and reflected by various underground formation such as the interface I. The intensity of the electrical signal is transmitted from each detector group through the amplifier to a time-scale recording device such as a multi-channel magnetic recorder where the intensity of the signal of each detector group is magnetically recorded upon the surface of a magnetically sensitized tape which is affixed, for example, to a rotating drum, all of which is well known to the art. The record produced upon the recording medium is thus a time-scale record of the signal intensity with the time-scale $t$ introduced by the movement of the recording medium at constant speed past the recording head. The record thus produced is, however, an uncorrected record.

When the magnetic signals have been subjected to the various corrections required, they are reproduced as visual signals by apparatus well known to the art. For example, a variable amplitude visual record can be formed by means of oscillographic recording apparatus of the well-known type wherein the signal is transmitted to a galvanometer such that a galvanometer mirror is rotated through an arc which is proportional to the signal. The axis of rotation of the mirror is such that a point of light impinged on the mirror is transmitted to a moving photosensitive recording strip and moved in the direction transverse to the direction of motion of the recording strip.

As has been previously discussed, it is the practice of the prior art in recording the signals, as described above, to utilize a filter system which optimizes the signal-to-noise ratio of the system to remove the noise from the reflected signals. Also, in order to keep the signals within the bounds of the multi-channel recording, in accordance with the prior art, it is the practice of the art to utilize automatic volume control. In accordance with the present invention, the signals from the various seismometer groups are recorded by broad band, high-fidelity recording without filters, or with minimum filters and with a programmed expander or a minimum automatic volume control. Some filtering may be necessary as, for example, when very strong "ground-roll" surface waves are present and would occupy 40 db of the dynamic range of the recording medium. Another instance of a filtering requirement is the case of marine resonance or "singing" which may produce resonant energy 40 db above the normal reflected energy. Automatic volume controls or a programmed expander are only needed to maintain the overall dynamic range of the recorded signal within the dynamic range of the recording medium.

As shown in FIGURE 1, upon the occurrence of a seismic disturbance at the shot point X as by firing a shot, the shock waves will progress away from the shot point and will be reflected by the interface I to each of the seismometer groups. The reflected waves will be detected at the various detectors after travelling along ray paths indicated as L in FIGURE 1. It can be seen by reference to the diagram of FIGURE 1 that the distance of the path from the shot point to the interface and thence to the detector $S_N$ is substantially greater than the length of travel of the wave and reflected wave to the first detector 101. The lag in arrival time of a reflected signal at a given seismometer over the time for a vertical path is the normal moveout which has previously been defined as the difference in reflection time from a horizontal reflector, between the seismometer at a distance $S_n$ from the source and a seismometer at the source. Thus, reflections from the same horizontal interface arrive at different detectors at different times and are so recorded on the time-scale record. The moveout at detector 101 is very small since the length of the wave path is only slightly longer than that for a perpendicular reflection. However, at detector N, the proportion of reflection time due to the normal moveout is much greater due to the greater horizontal distance $S_N$. The moveout then is the portion of the total time for a wave to reach a detector which is due to the horizontal distance of the detector from the shot point. As the waves are reflected from deeper interfaces, it will be seen that the proportion of the reflection time due to the distance of the seismometer from the shot point decreases and will approach zero as the depth of the interface from which the wave is reflected approaches infinity.

The time-scale correction of the record to introduce the moveout correction is then a function of two variables, the distance of the detector and the time of the reflection.

A static correction is introduced into the record to produce a corrected record which static correction is to compensate for the fact that, in general, the seismometers are situated at various elevations and it is necessary to make time-scale adjustments to reduce all readings to a common horizontal plane. Similarly, adjustments of the time scale are necessary to compensate for varying amounts of near-surface weathered material under the different detector groups. The "dip" correction is introduced as a static correction in order to compensate for the time-scale differences of arrival of reflected signals from the interface I, which differences are caused by the fact that the interface is not horizontal. That is, when the interface I is not horizontal, and is inclined as shown in FIGURE 1, the signal reflected from a point toward the detector at distance $S_N$ will traverse a lesser vertical distance than a signal reflected from a point nearer the origin to a nearer detector.

Although various methods and means for introducing the static and dynamic time-scale corrections in a magnetically recorded seismographic record can be utilized, the method and apparatus disclosed and claimed in co-pending application Serial No. 659,434, filed May 15, 1957, entitled "Multi-Channel Recorder" by Henry Salvatori, Melvin J. Wells and Hardy Glenn, now U.S. Patent No. 3,044,041, is particularly suited and is utilized in the presently preferred method of the present invention. That is, as described above, the uncorrected high-fidelity, broadband recording of the signals received at the various seismometer groups is recorded as a multi-channel recording upon a magnetic tape. This tape is not corrected statically or dynamically. The uncorrected tape is, therefore, played back through an apparatus such as that described and shown in application Serial No. 659,434 at which time the static and dynamic corrections are made to produce signals which are corrected for normal moveout and dip and to correct the seismometer groups to a common horizontal plane. Briefly, the apparatus described in the above application comprises a multi-channel magnetic tape playback machine with a plurality of channels corresponding to the plurality of recorded channels in the uncorrected magnetic tape which serves as a signal source to the apparatus. The signal from each of the uncorrected channels is transmitted to a corresponding reproducing head in the playback apparatus, which head is mounted relative to the tape drum for movement along the channel to vary the time-scale position of the reproducing head. Each of the reproducing heads is independently movable and is initially moved to a predetermined distance relative one to the other to introduce the various static corrections necessary in order to produce the corrected magnetic tape. Each of the heads is also movable during playback in order to introduce the necessary dynamic time-scale changes as described hereinbefore. Thus, in playback, the time-scale positions at which signals reflected from a given interface are received are all aligned in the various channels since the seismometer groups have been reduced to a common horizontal plane, the interface from which these signals have been reflected has been corrected to a horizontal interface and the horizontal distances between each of the seismometers and the shot point have been eliminated. Each of these reflected signals will occur at substantially the same time-scale position in each of the channels due to the corrections introduced by the playback machine. It should be noted, of course, that each of the recorded signals still contains the noise received at the seismometer group.

It frequently occurs that reflections in different portions of a record have different dip moveouts. In this case, it is necessary to determine from conventional records the actual dip moveout at different times and then to make separate playbacks for the purpose of stratigraphic determinations in accordance with this invention for each of several dip moveouts. Normally, a variation in one record of 10 milliseconds of moveout, due to dip or other causes, may be tolerated without substantially harming the results. This tolerance limit is, however, frequency dependent and may be subject to change in individual situations.

In the reproduction and recording of signals by magnetic tape recording, the recording heads which receive the input signal voltage magnetize the tape to an extent proportional to the impressed voltage such that the magnetization is a function of the input voltage. Upon playback of the recorded tape, the output from the playback head is a signal voltage which is 90° out of phase with, and has a rising frequency characteristic relative to, the original input voltage as is well known in the recording art and explained in references such as:

Elements of Sound Recording, John F. Frayne and Halley Wolfe, John Wiley & Sons, New York, 1949, page 593, particularly Formulas 29–1 and 29–2;

Magnetic Recording Techniques, W. Earl Stewart, McGraw-Hill, New York, 1958, page 67, Formulas 3–2 and 3–3;

Magnetic Tape Instrumentation, Gomer L. Davies, McGraw-Hill, New York, 1961 (published prior to November 1961).

To make the reproduced signal from the playback head substantially a reproduction of the input signal, the output signal from the playback head is passed through an equalizer circuit which transforms the signal being reproduced to a signal which is now directly proportional to the input voltage. Such equalizer circuits are well known integrator circuits which introduce a 90° phase shift and invert the rising frequency characteristics described above. Such circuits are described in the above references, e.g., Magnetic Recording Techniques, supra, pages 99–104.

Figure 2:
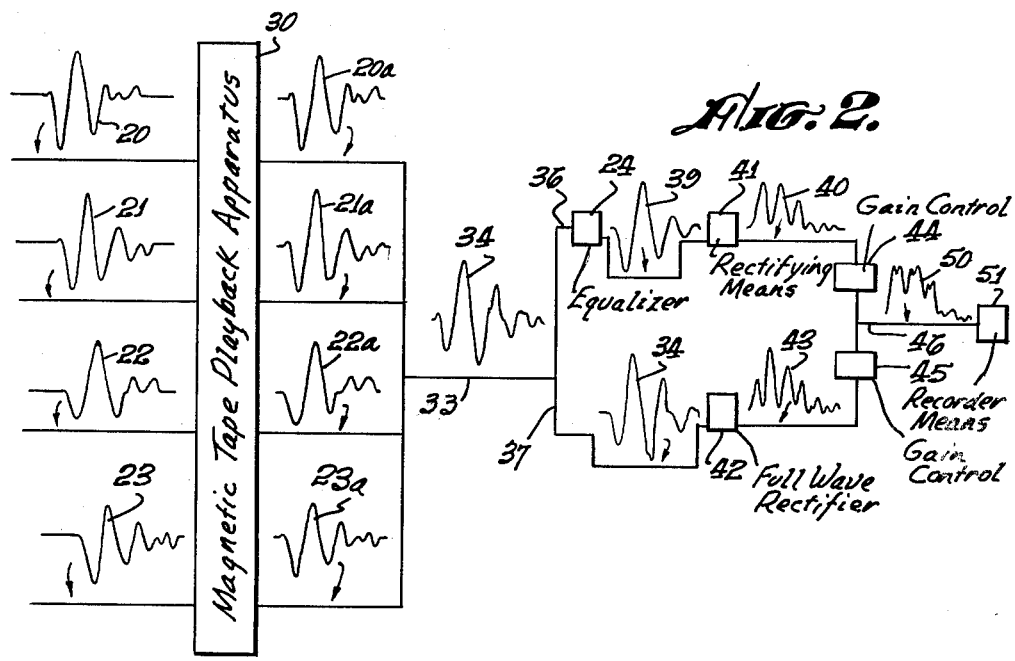
FIGURE 2 is a diagrammatic view illustrating the steps performed upon the transient signals received at the various seismometer groups.

Referring now to FIGURE 2, a schematic representation of the method of the present invention is shown. For purpose of illustration, four seismograph traces are shown in a record although it is to be understood that more conventionally a larger number such as twenty-four will be utilized. The uncorrected signals 20, 21, 22 and 23 are processed through an apparatus 30 as previously described to introduce static and dynamic time-scale corrections. The corrected plurality of signals 20a, 21a, 22a, and 23a are then transmitted to a common point 33 to form a single summed signal 34. The summed signal 34 is then transmitted along parallel paths 36 and 37. The corrected summed signal 34 is transmitted to an equalizer 24 in the first branch 36 as described hereinbefore in the normal reproduction manner. After being equalized, the corrected summed, equalized signal 39 is processed through a rectifying means 41 of the type well known to the art. The full-wave rectifier 41 transforms the equalized signal 39 to a rectified signal 40 which signal 40 is the absolute value of the signal 39.

Similarly, the corrected summed signal 34 along the second path 37 is processed through a full-wave rectifier 42 as described above without equalization to obtain the signal 43 which signal is the absolute value of the corrected summed, non-equalized signal 34.

The signals 40 and 43 are then conducted through a gain control 44 and 45 respectively to a common point 46 where they are mixed. The gain controls 44 and 45 are for the purpose of mixing appropriate quantities of the equalized 40 and non-equalized 43 signals. That is, it is necessary under most circumstances to mix equal quantities of the two signals and the gain controls are used to compensate for any imbalance existing in the amplifiers or other circuitry through which the equalized and non-equalized signals pass prior to the point of mixing.

At the common point 46, the equalized and non-equalized signals are mixed to yield a highly characteristic and distinguishable composite signal 50 which is then recorded by recorder means 51, to form a visual record, which recorder means can be any one of the many such recorders known to the art.

The signal 50 being a composite of an equalized and a non-equalized signal has a character highly indicative of the character of the stratigraphic information of the geologic section under survey.

Figure 3:
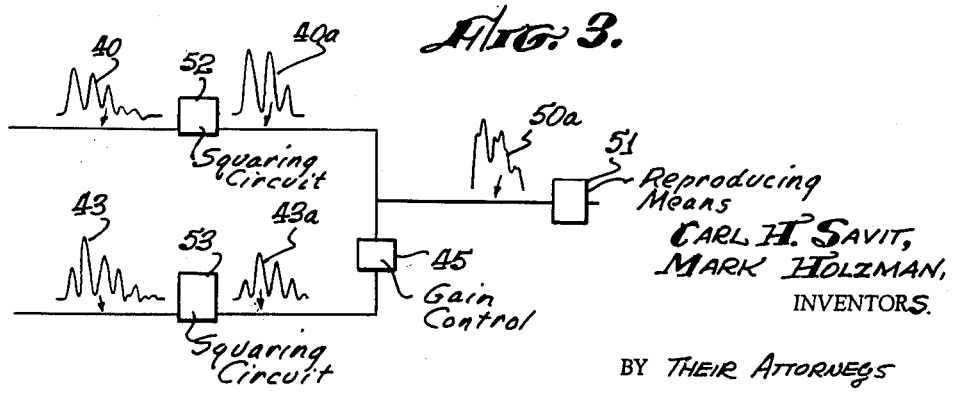
FIGURE 3 is a detail view depicting an alternative embodiment and summations of equalized and non-equalized signals obtained thereby.

Referring now to FIGURE 3, rectifiers and associated circuitry can also be utilized to form squared and higher powers of the signals to produce a composite visual signal which has an increased contrast ratio between signal and background. Thus, in FIGURE 3, the equalized rectified signal 40 comparable to that of FIGURE 2 is subsequently transmitted through a squaring circuit 52 in this embodiment to produce a squared, equalized, rectified signal 40a and similarly the unequalized, rectified signal 43 is transmitted through a squaring circuit 53 to produce the squared summed, non-equalized, rectified signal 43a after which the squared signals are mixed in proper proportion through a gain control 45 to produce the squared composite signal 50a which is then visually reproduced by reproducing means 51.

We have found that the summation of the various signals to form a single signal serves to eliminate or at least greatly reduce the background noise which in the prior art is removed by filtering. Since, however, the characteristic seismic signal is highly oscillatory, we have found that by combining that signal in various ways with the unequalized signal which is 90° out of phase, the oscillations may be removed also without recourse to filtering. In this way, a characteristic pulse is formed corresponding to each reflection. This pulse is formed from received energy unaltered by filtering and largely unaffected by automatic gain controls.

Thus, the present invention provides an improved method of recording seismographic information whereby the recorded information is qualitative such that the kinds of underground formation are determinable from the records. Such method results in a visual record which can be easily analyzed to detect lithological changes in subsurface strata.

What is claimed is:
1. A method of geophysical exploration for locating and identifying underground strata comprising the steps of:
    (a) recording a plurality of signals reflected from a reference point by underground strata upon a like plurality of channels of a magnetic tape recorder;
    (b) combining said plurality of recorded signals as a first and second summed signal, said first signal being a summed, equalized signal of said plurality, said second signal being a summed, non-equalized signal of said plurality;
    (c) obtaining the absolute value of said first and second signals; and,
    (d) adding said absolute values of said first and second signals in predetermined proportions to obtain a composite single signal.

2. A method of geophysical exploration for locating and identifying underground strata comprising the steps of:
    (a) recording a plurality of signals reflected from a reference point by underground strata upon a like plurality of channels of a magnetic tape recorder;
    (b) combining said plurality of recorded signals as a first and second summed signal, said first signal being a summed, equalized signal of said plurality, said second signal being a summed, non-equalized signal of said plurality;
    (c) obtaining the absolute value of said first and second signals;
    (d) adding said absolute values of said first and second signals in predetermined proportions to obtain a composite single signal; and,
    (e) recording said composite signal as a visual record.

3. A method of geophysical exploration for locating and identifying underground strata comprising the steps of:
    (a) recording a plurality of signals reflected from a reference point by underground strata upon a like plurality of channels of a magnetic tape recorder;
    (b) adding said plurality of recorded signals to obtain a summed signal;
    (c) forming an equalized signal of said summed signal;
    (d) obtaining the absolute value of said equalized summed signal;
    (e) obtaining the absolute value of said summed signal in non-equalized form; and,
    (f) adding said absolute value, equalized, summed signal and said absolute value, non-equalized, summed signal in predetermined proportions to obtain a composite single signal.

4. A method of geophysical exploration for locating and identifying underground strata comprising the steps of:
    (a) recording a plurality of signals reflected from a reference point by underground strata upon a like plurality of channels of a magnetic tape recorder;
    (b) adding said plurality of recorded signals to obtain a summed signal;
    (c) forming an equalized signal of said summed signal;
    (d) obtaining the absolute value of said equalized summed signal;
    (e) obtaining the absolute value of said summed signal in non-equalized form;
    (f) adding said absolute value, equalized, summed signal and said absolute value, non-equalized, summed signal in predetermined proportions to obtain a composite single signal; and,
    (g) recording said composite signal as a visual record.

5. A method of geophysical exploration for locating and identifying underground strata comprising the steps of:
    (a) recording a plurality of signals reflected from a reference point by underground strata upon a like plurality of channels of a magnetic tape recorder;
    (b) obtaining from said plurality of recorded signals a plurality of equalized signals;
    (c) adding said plurality of equalized signals to obtain an equalized summed signal;
    (d) rectifying said equalized, summed signal to obtain the absolute value thereof;
    (e) adding said plurality of recorded signals to obtain a non-equalized, summed signal;
    (f) rectifying said non-equalized, summed signal to obtain the absolute value thereof; and,
    (g) adding said absolute value, equalized, summed signal and said absolute value, non-equalized, summed signal in predetermined proportions to obtain a composite single signal.

6. A method of geophysical exploration for locating and identifying underground strata comprising the steps of:
    (a) recording a plurality of signals reflected from a reference point by underground strata upon a like plurality of channels of a magnetic tape recorder;
    (b) obtaining from said plurality of recorded signals a plurality of equalized signals;
    (c) adding said plurality of equalized signals to obtain an equalized summed signal;
    (d) rectifying said equalized, summed signal to obtain the absolute value thereof;

(e) adding said plurality of recorded signals to obtain a non-equalized, summed signal;
(f) rectifying said non-equalized, summed signal to obtain the absolute value thereof;
(g) adding said absolute value, equalized, summed signal and said absolute value, non-equalized, summed signal in predetermined proportions to obtain a composite single signal; and
(h) recording said composite signal as a visual record.

References Cited by the Examiner
UNITED STATES PATENTS 2,767,388 10/56 Rust _____ 340—15.5
2,978,673 4/61 Graham _____ 340—15.5

BENJAMIN A. BORCHELT, *Primary Examiner.*
KATHLEEN CLAFFY, SAMUEL FEINBERG,
*Examiners.*